United States Patent [19]

Lundgren

[11] Patent Number: 4,645,395
[45] Date of Patent: Feb. 24, 1987

[54] LOCKING NUT

[75] Inventor: Bengt Lundgren, Lerum, Sweden

[73] Assignee: SKF Nova AB, Gothenburg, Sweden

[21] Appl. No.: 646,455

[22] Filed: Sep. 4, 1984

[30] Foreign Application Priority Data

Nov. 23, 1983 [SE] Sweden .............................. 8306455

[51] Int. Cl.[4] ............................................ F16B 39/12
[52] U.S. Cl. .................... 411/210; 411/247;
411/255; 411/279; 411/295; 411/304; 411/317
[58] Field of Search .............. 411/209, 210, 211, 212,
411/213, 246, 247, 253, 254, 255, 256, 277, 278,
279, 294, 295, 301, 302, 303, 304, 315, 316, 317,
318

[56] References Cited

U.S. PATENT DOCUMENTS

| 1,156,105 | 10/1915 | Sleeper | 411/294 |
| 1,183,190 | 5/1916 | Hansell | 411/937.2 X |
| 1,289,167 | 12/1918 | Hatten | 411/295 |
| 3,139,134 | 6/1964 | Russell et al. | 411/304 |
| 4,086,946 | 5/1978 | Keen | 411/279 |
| 4,436,468 | 3/1984 | Ozaki | 411/295 X |

FOREIGN PATENT DOCUMENTS

| 615568 | 7/1935 | Fed. Rep. of Germany | 411/427 |
| 1029621 | 5/1958 | Fed. Rep. of Germany | 411/294 |
| 2135175 | 2/1972 | Fed. Rep. of Germany | 411/301 |
| 755124 | 9/1933 | France | 411/294 |
| 50020 | 4/1918 | Sweden | 411/279 |
| 490680 | 8/1938 | United Kingdom | 411/304 |
| 720216 | 3/1980 | U.S.S.R. | 411/304 |
| 727883 | 4/1980 | U.S.S.R. | 411/278 |
| 731108 | 5/1980 | U.S.S.R. | 411/278 |
| 737673 | 5/1980 | U.S.S.R. | 411/279 |

Primary Examiner—Thomas J. Holko
Attorney, Agent, or Firm—Eugene E. Renz, Jr.

[57] ABSTRACT

The invention concerns a nut provided with a locking element (4, 5, 6, 7), which by e.g. a screw (8, 9, 10, 11) can be urged radially against a screw thread. In order to provide a self-contained and easily releasable nut the locking element is arranged in a recess which, together with the element, is so arranged that at least a part (12, 13, 14, 15) of the element is deformed elastically when the element is moved against the screw thread. Thereby the element springs out of contact with the thread when the screw (8, 9, 10, 11) is released.

2 Claims, 1 Drawing Figure

LOCKING NUT

FIELD OF THE INVENTION

The invention relates to a nut having means for locking it against accidential rotation when desired.

BACKGROUND OF THE INVENTION

Such a nut is known by e.g. GB Pat. No. 22514/1899. The nut can be easily and effectively locked in any desired position on a threaded member without the position of the nut being influenced by the clamping force necessary to achieve the locking action.

One disadvantage of the known nut is that the element which is displaceable radially in the nut and is pressed against the thread co-operating with the nut during the locking action has a tendency to obstruct the turning of the nut even when the means used to press the element against the thread has ceased to act on the element, since no positive returning force affects the element, which therefore because of friction and possibly other mechanical or chemical influence, e.g. after a prolonged period of staying tightened, runs the risk of remaining in operative position against the thread, thereby breaking the turning of the nut when the nut is unscrewed. Handling of the nut is also complicated because the parts of the nut are not self-contained before the nut is mounted on e.g. a screw or a threaded journal, and the locking element can then easily fall off the radially inwardly open recess in which it is intended to be positioned.

SUMMARY OF THE INVENTION

The purpose of the present invention is to achieve a lockable nut of the kind mentioned above, which nut can easily be unscrewed from a thread and which in a preferred embodiment can constitute a self-contained unit even when it is not situated on a thread. This is achieved, according to the invention, by giving the nut the characterizing features defined in claim 1. Such a nut can be locked effectively in any desired position on a thread, and the lockiing operation does not change the position of the nut. The parts of the nut can be manufactured easily and inexpensively, and the nut can be assembled and handled without difficulty.

BRIEF DESCRIPTION OF THE DRAWING

The following is a detailed description of the invention with reference to the accompanying drawing, which shows a nut and four different locking members. All embodiments are, for the sake of simplicity, shown in the same nut, whereas in reality each nut is suitably provided with only one locking member.

DESCRIPTION OF THE PREFERRED EMBODIMENT

Figures 1, 1A:
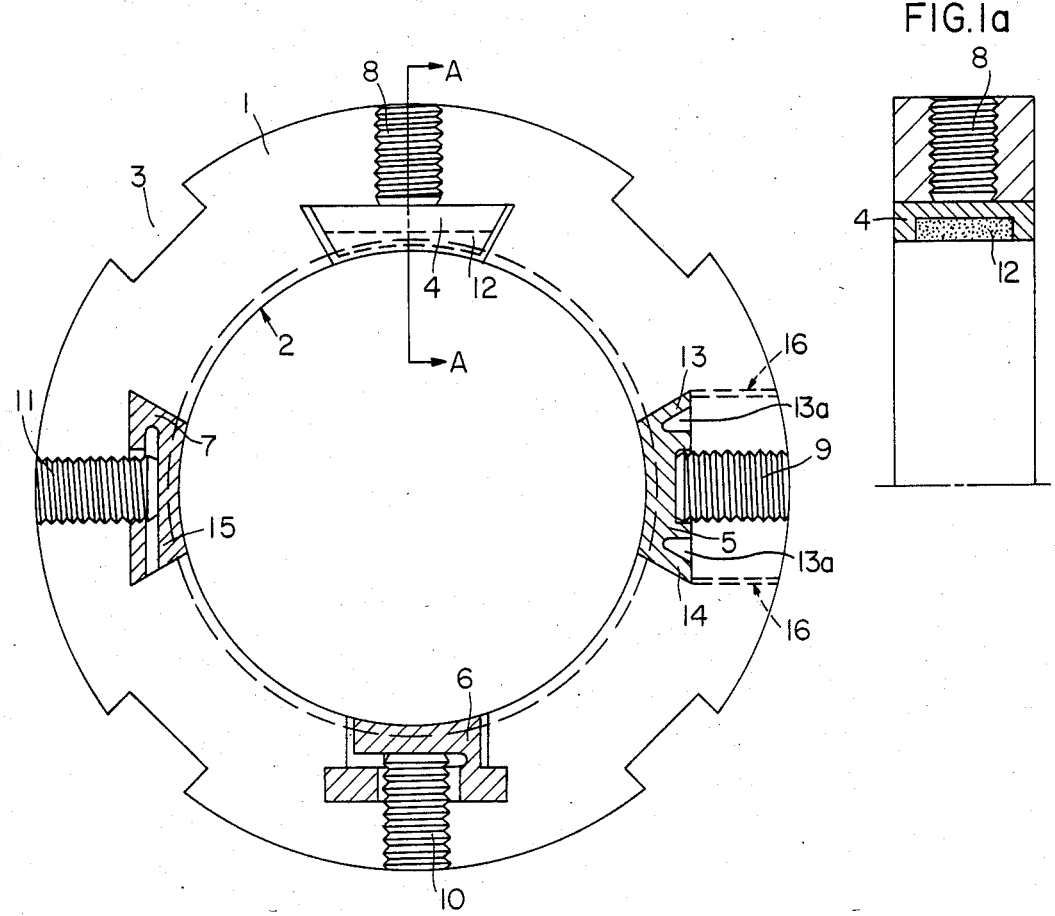

The nut 1 is provided with an internal thread 2 and a number of external recesses 3 intended for co-operation with a wrench. For locking of the nut, an element 4, 5, 6, 7 is arranged to be urged radially against a thread arranged on e.g. a screw or a shaft and co-operating with the nut. The element is situated in a recess in the nut facing said thread and is provided with a thread portion corresponding to and co-operating with said thread. The threaded portion of the element thus essentially covers the opening of the recess and constitutes a complement to the nut thread 2. The nut is also provided with means 8, 9, 10, 11 by which the element 4, 5,

6, 7 can be urged radially against the thread on which the nut is arranged. According to the invention the element and the recess are so designed that at least a portion of the element is deformed elastically by the radial displacement, so that the thread portion on the element tends to be returned out of contact with the nut thread when the radially displacing force and thereby the elastic deformation ceases. Further, the opening of the recess should be smaller than the greatest extension of the element across the opening, so that the element is prevented from falling radially out of the recess when the nut is not mounted on a threaded member.

The recess has preferably the shape of a groove which extends axially through the nut and cuts out a portion of the nut thread, and the element has an outer cross sectional profile which corresponds to the profile of the groove, whereby it can be displaced along the groove. Nuts having such grooves can be manufactured easily, and elements with a suitable profile can be made by e.g. making bars with the desired profile, which bars are cut into suitable lengths corresponding to the length of the element. Such an element can easily be mounted into a nut by being pushed into the groove in the nut from one side.

The recess for the element 4, 5 and 7, respectively, according to the figure, has side walls converging towards the opening, and the element has a corresponding wedge-like profile. The element 4, 5 has portions which resiliently engage the walls of the recess and which are elastically deformed when the element is urged against the thread co-operating with the nut. When the urging force ceases, the element moves radially outwards since the spring force against the side walls has a radially directed component. In one embodiment the element 4 has a portion made of an elastically compressible material 12, e.g. a polymer material, arranged in a tranversal groove, which appears from the section A—A in the figure. The main portion of the element 4 is rigid and may be made of steel. This portion is arranged with a certain play sidewise in relation to the walls of the groove in the nut when the element takes its radially outermost position, whereas the resilient portion 12 extends without play between the walls of the groove in this position, whereby the element can be pressed inwards into engagement with the thread co-operating with the nut during compression of the resilient portion by its contact with the walls of the groove.

According to another embodiment, the element 5 has elastically flexible portions 13, 14 protruding at an angle and spaced outwardly from the body part 5*a* of the element which engages the thread co-operating with the nut. The outer sides of the portions 13, 14 engage the walls of the groove in the nut, which walls converge towards the opening of the groove, and the portions 13, 14 are deformed elastically inwards towards the body part 5*a* of the element when the element is urged into contact with the thread co-operating with the nut. When the urging force ceases, the portions 13, 14 are expanding outwards, thereby returning the element 5 into non-operative position so that the locking effect ceases. The element may e.g. consist of a cold extruded aluminum profile.

In a third embodiment a part 15 of the element 7, which is provided with a thread portion, is resiliently connected to the rest of the element and co-operates with a member 11 for bending the part 15 into contact with the thread co-operating with the nut. The element 7 has a principally U-shaped profile, the part 15 constituting one of the legs of the U and being elastically flexible in relation to the rest of the element. The element may for example be made as a bent steel plate.

According to another embodiment of the invention shown in the figure the walls of the recess in the nut do not converge continuously towards the opening, but are instead provided with steps, and the element 6 has a corresponding shape. The part of the element which covers the opening of the recess is resiliently connected to the rest of the element, by analogy with the design of the element 7.

The radial displacement of the element is preferably brought about by a screw 8, 9, 10, 11 arranged in a threaded bore which leads into the recess in which the element is arranged. Such an arrangement is easy and inexpensive to make and to operate and can be used as a stop against accidental axial displacement of the element in the groove. In case only a portion of the element 6, 7 is to be displaced radially, the screw may pass through a hole in the non-displaceable portion of the element.

Instead of using a recess in the shape of a groove in the nut, it is possible to use a recess in the shape of e.g. a radial cylindrical bore with a tapered end portion adjacent the nut thread, whereby the element arranged in the bore should have a corresponding shape. The element can easily be mounted if the bore runs through the nut wall, whereby the element can be inserted radially through the opening in the cylindrical end of the bore. This opening may substantially be closed by e.g. a cover provided with external threads which is screwed into a threaded portion of the bore. The cover may be provided with a threaded central bore for co-operation with a screw used for displacing the element, or it may possibly itself be used for that purpose. For example, the element 5 may, as an alternative to the above described design, be circular and be surrounded by an annular collar 13, 14 and mounted in a cylindrical-conical bore as suggested by the dashed lines 16, which can indicate a threaded bore provided with a cover with a bore for the screw 9.

The invention is, with obvious modifications, applicable also for a nut with external threads and intended for being screwed into a threaded bore and locked therein.

What is claimed is:

1. A nut adapted to be locked against rotation relative to a threaded member comprising a generally annular body portion having a threaded internal bore cooperating with the threaded member, means defining at least one recess in the body portion opening into said bore, an element separate from the nut having a thread portion corresponding to the nut threads engageable in said recess, means for displacing the element radially in said recess to a locking position wherein the thread portion of the element locks against said threaded member, said element including a body portion and flexible wing members elastically deformable upon actuation of said element to the locking position and operable upon release of said means to automatically effect displacement of said element in a direction out of contact with the threaded member when the displacing force is removed and, therefore, the elastic deformation ceases, said recess including tapered side walls converging toward the portion of said recess opening into said bore and said flexible wing members being spaced from said body portion and having tapered outer surfaces complementing the tapered side wall of said recess whereby actuation of said means in one direction to move said element to a locking position effects inward displacement of said wing members and wherein said wing members expand outwardly upon release of said means thereby returning said element to its non-operative position wherein the locking effect ceases.

2. A nut as claimed in claim 1, including an axial groove communicating with and forming a part of said recess and being of a predetermined cross section and wherein said element as a cross section profile corresponding to the profile of said groove and is displaceable along said groove.

* * * * *